March 5, 1957 O. C. LEE 2,783,581
RODENT EXTERMINATING APPARATUS
Filed July 14, 1952 2 Sheets-Sheet 1

INVENTOR
Oscar C. Lee
BY Robert M. Dunning
ATTORNEY

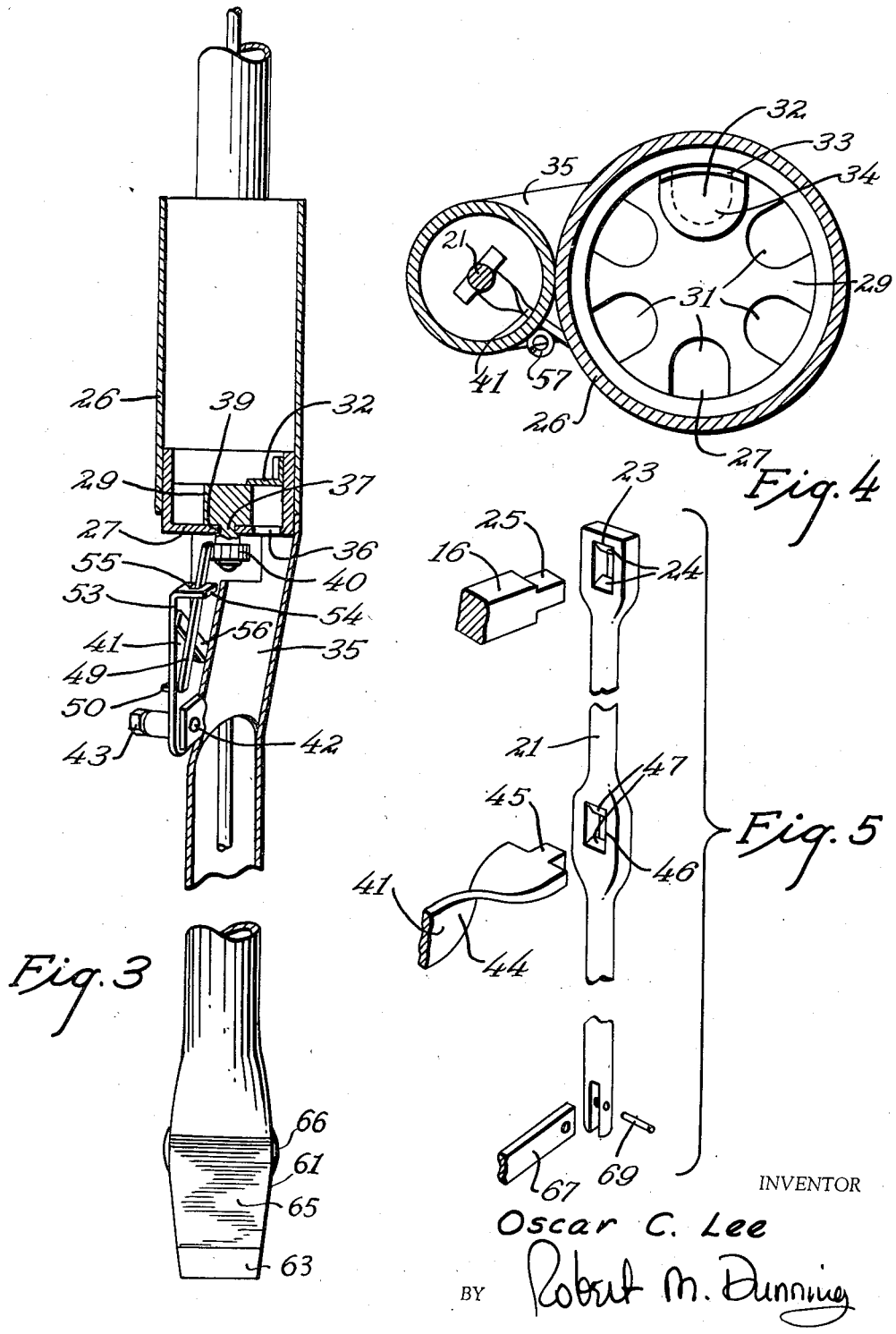

United States Patent Office 2,783,581
Patented Mar. 5, 1957

2,783,581

RODENT EXTERMINATING APPARATUS

Oscar C. Lee, River Falls, Wis.

Application July 14, 1952, Serial No. 298,676

2 Claims. (Cl. 43—124)

This invention relates to an improvement in rodent exterminating apparatus and deals particularly with a device useful in poisoning pocket gophers and similar animals.

It has been said that pocket gophers cause more destruction than any other living animal. These small animals burrow beneath the ground and create a net work of tunnels beneath the ground. As the animals are extremely alert, they are difficult to kill. The present device comprises an apparatus for depositing poison directly in the burrow of the gopher and does so without leaving telltale evidence to warn the gopher.

An object of the present invention resides in the provision of an elongated tubular member designed to extend into the ground to intersect a tunnel or burrow and to deposit therein a pellet of poison or an edible containing poison so as to exterminate animals such as pocket gophers. The tubular body is inserted into the ground and the end of the body has a closure which may be opened when the burrow is intersected to drop the poisoned food.

A feature of the present invention resides in shaping the lower end of the tubular member so that it may be easily forced into the ground and so that it may be readily determined when the tip of the device has intersected a burrow or tunnel. In order to accomplish this result the lower end of the tubular member is provided with a wedge shaped point incorporating a closure which may be opened to drop the poisoned food. The lower end of the tubular body just above the wedge shaped point is of larger diameter than the adjoining portion of the tubular body is as to form a slightly larger opening than is required for the major portion of the tubular body. As a result when the enlarged portion of the apparatus passes into a tunnel through the earth the tubular body will drop readily through the opening formed and will provide an immediate indication that the tunnel has been intersected.

A feature of the present invention resides in the provision of a handled body which may be easily forced down into the ground at an estimated point to intersect a tunnel made by a pocket gopher, the tubular body also acting to conduct the poisoned food from a supply reservoir to the dispensing end of the apparatus.

These and other objects and novel features of my invention will be more clearly and fully set forth in the following specification and claims.

In the drawings forming a part of the specification:

Figure 3 is a sectional view through the supply hopper showing the mechanism for actuating the poisoned food dispensing apparatus.

Figure 4 is a sectional view transversely through the tubular member and the dispenser showing the construction thereof.

Figure 5 is a perspective view of a detail portion of the apparatus.

Figures 1, 2:
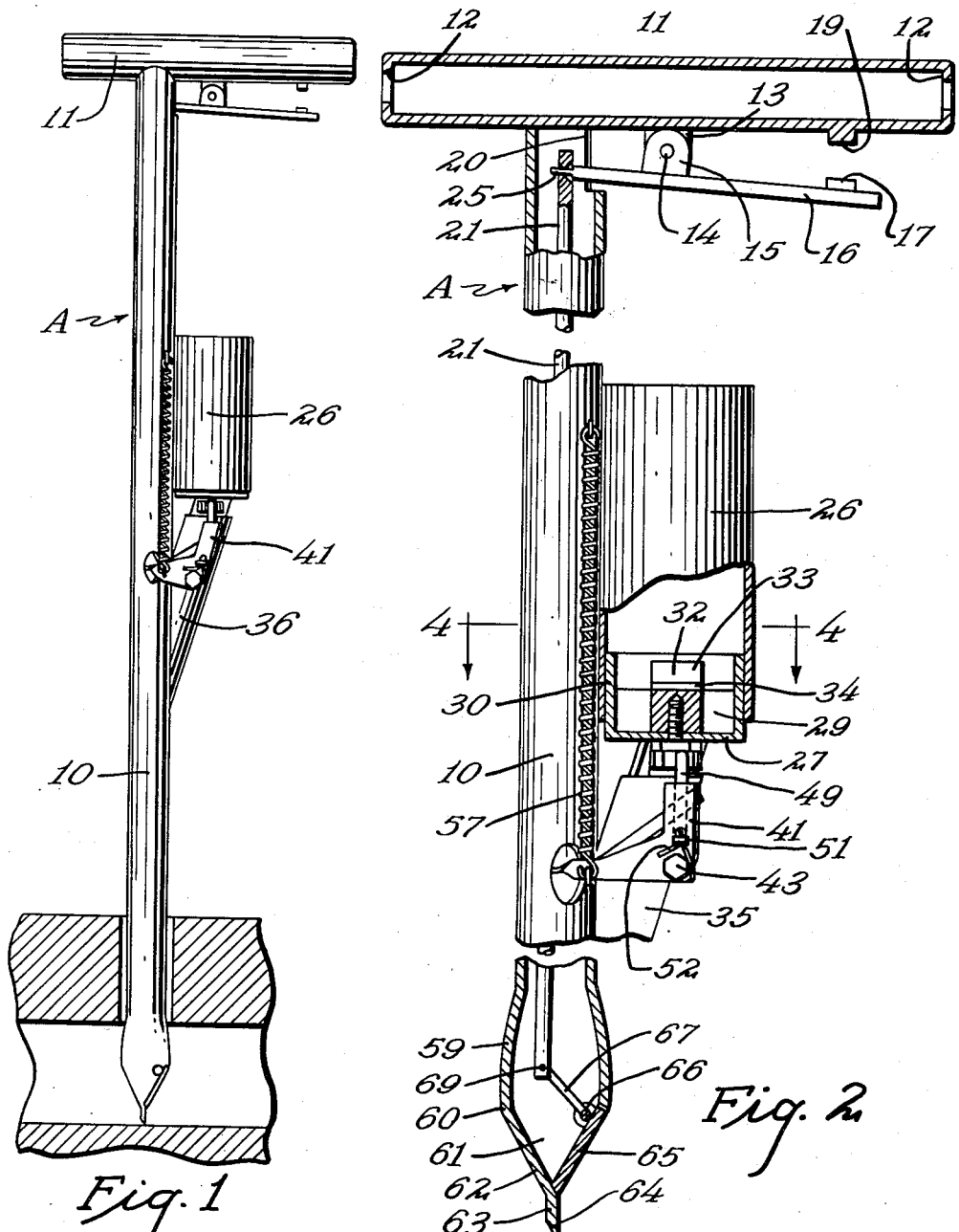
Figure 1 is a side elevational view of the gopher poisoning apparatus showing the relationship of parts therein.
Figure 2 is an elevation view partly in section and enlarged to show the constructional details.

The pocket gopher dispensing apparatus is indicated in general by the letter A. This device includes an elongated tubular body 10 having a transversely extending handle 11 secured thereto at one end thereof. The ends of the tubular handle 11 are partially drawn or spun inwardly to provide inwardly extending flanges 12 at opposite ends thereof.

One or more lugs 13 are secured to the undersurface of the handle 11 to accommodate a pivot pin 14. The pivot pin 14 pivotally connects the lug 13 with a similar lug 15, secured to an operating handle lever 16. The handle lever 16 is provided with a suitable stop projection 17 which is cooperable with a similar projection 19 on the handle 11 to limit pivotal movement of the lever 16 in one direction.

The lever 16 extends through an aperture 20 at the upper end of the tubular body 10. An elongated operating link 21 is provided with an aperture 23 extending therethrough near one end thereof. The upper end and lower end 24 of the opening 23 are rounded so as to serve as a fulcrum for the lever 16. In other words, the end 25 of the lever 16 which extends through the body aperture 20 also extends through the link aperture 23 and may act to move the link 21 longitudinally upon pivotal movement of the lever 16.

A hopper or bait receptacle 26 is supported adjacent to the tubular body 10 at a point below the handle 11. In the particular form of construction illustrated the hopper 26 is circular in cross section and is provided with a substantially closed bottom 27. A rotor 29 is pivotally supported above the closed bottom 27 of the hopper within the ring shaped wall 30 which is telescoped with the cylindrical hopper body 26 at the lower end thereof. The rotor 26 is provided with peripheral angularly spaced notches 31, best illustrated in Figure 4 of the drawings. Each of the notches 31 is of proper size to accommodate a spherical pellet of poisonous bait. Obviously the bait could be in other than spherical form, but the spherical form has advantages over other forms for reasons which will be later described in detail.

A lip 32 is secured to the wall of the ring shaped flange 30. The lip 32 is angular in shape having a curved upwardly extending wall 33 which extends along the inner surface of the cylinder wall 30 and is secured thereto. The lip also includes a horizontal flange 34 which overlies the rotor 29 and covers one of the notches 31. In other words, as the rotor 29 rotates about its axis, the peripheral notches therein are successively moved beneath the lip 32.

A chute 35 is secured to the lower end of the tubular body 26 and inclines toward the tubular body 10 and is connected thereto. The wall of the tubular body 10 is cut away at the juncture between the chute 35 and the tubular body 10 so that pellets of poisonous material falling into the chute 35 will be directed into the lower end of the tubular body 10. An aperture 36 is provided through the closed bottom 27 directly beneath the lip 32. Thus the poisoned pellets contained in the notches 31 will be successively dropped into the chute 35 and the notch communicating with the opening 36 is covered by the lip 32 so that only one pellet will be discharged at a time.

A shank 37 is provided on the rotor 29 and projects axially therefrom. This shank 37 extends through a center opening 39 in the hopper bottom 27. A ratchet wheel 40 is mounted upon the shank 37 beneath the hopper bottom 27. This ratchet wheel is actuated an angular distance equal to the distance between the notches 31 by a means which will now be described in detail.

A bell crank lever 41 is pivotally supported at 42 by a pivot bolt 43 which extends into a part of the chute 35. The bell crank lever 41 in the arrangement illustrated is formed of sheet metal and is provided at one end with a twist 44 which twists the lever through ninety degrees. A projection 45 on the lever 41 extends through an aperture 46 in the link 21. The upper and lower ends 47 of the aperture 46 are rounded or wedge shaped to act as a fulcrum for the lever extremity 45. Longitudinal movement of the link 21 thus serves to rotate the bell crank lever 41 about its pivot 43.

A ratchet pawl 49 is provided with an angularly turned extremity 50 which extends through an aperture 51 in the bell crank lever 41. A cotter peg or other retaining means 52 extends through the angularly turned end 50 to hold the end in its aperture. The aperture is sufficiently large to permit the pawl 49 to pivot toward or away from the plane of the bell crank lever 41 within reasonable limits.

The upper end of the lever arm 53 of the lever 41 is bent at right angles as indicated at 54 and is provided with an aperture 55 extending therethrough for accommodation of the pawl 49. A flat spring 56 is anchored to the bell crank lever and urges the pawl 49 away from the plane of the lever. The aperture 55 is of sufficient size to permit the required angular movement of the pawl 49. This pawl engages against the ratchet wheel 40 and acts to rotate the same upon oscillation of the bell crank lever.

A spring 57 is connected at its lower end to the lever 41 and tends to rotate this lever in a clockwise direction as viewed in the drawings. This action also tends to pull the link 21 upwardly and tends to pivot the handle lever 16 in a clockwise direction as viewed in the drawings. The spring also acts to hold the closure in closed position as will be later described.

The lower end of the tubular body 10 is belled outwardly as indicated at 59 to be at a maximum diameter at its lower end 60. The wall of the body 60 is substantially wedge shaped beneath the point of largest diameter 60, this lower end being substantially trapezoidal in a horizontal elevation. The end walls 61 of the wedge shaped portion are relatively angularly inclined inwardly from a substantially parallel relationship in a horizontal elevation as indicated in Figure 3 of the drawings, and one of the connecting walls 62, which is on a sharper incline than end walls 61, and tapers to substantially a plane through the axis of the hollow body and then extends in this plane to form a blade 63 having a wedge shaped extremity 64. The sloping wall 65 opposite the tapering wall 62 is separate from the remaining walls and is hingedly connected thereto as indicated at 66. An arm 67 projects inwardly at substantially right angles to the door or closure panel 65 and is pivotally connected at 69 to the lower end of the link 21. In elevated position of the link 21 the closure panel 65 is in the closed position illustrated in the drawings. However, when the link 21 is moved downwardly the arm 67 acts to swing the panel 65 into open position.

The operation of my apparatus is believed obvious from the foregoing description. The handle 11 of the apparatus is grasped and the lower end of the tubular body 10 is forced down into the ground. Pocket gophers ordinarily follow a pattern in producing tunnels and the approximate position of the tunnels may be estimated by a person skilled in the art. As the enlarged diameter portion 60 passes through the earth it forms an opening somewhat larger than the handle portion above the enlarged end. Thus when the enlarged portion intersects a tunnel, the downward pressure upon the handle will suddenly force the tool into the burrow with considerably less downward pressure, providing a clear indication when the tunnel has been intersected.

When the pointed end of the tool is in the tunnel, the handle lever 16 is pivoted in a counter-clockwise direction so that the end 25 of this lever will urge the link 21 downwardly. This action rotates the rotor 29 and drops a poisoned pellet through the chute 35 and the lower end of the tubular body 10. The downward movement of the link also opens the lower end of the tubular body, allowing the pellet to drop into the tunnel.

As the apparatus intersects the tunnel a small amount of dirt will drop to the floor of the tunnel forming a slight mound. If the poisoned pelled is spherical in form it will roll away from the mound along the floor of the tunnel so that the pellet will be found by the pocket gopher at a point spaced from the disturbed area. The rolling of the pellet can be increased if the operator is sufficiently familiar with the habits of the animals to intersect a portion of the tunnel which is inclined. The main tunnel usually is provided with extensions which are directed at substantially right angles to the main tunnel and a mound of earth is built up at the end of each such extension. These extensions are usually inclined upwardly from the main tunnel so that if this portion is intersected the spherical pellets will roll toward the main tunnel.

In accordance with the patent statutes, I have described the principles of construction and operation of my rodent exterminating apparatus, and while I have endeavored to set forth the best embodiment thereof, I desire to have it understood that this is only illustrative thereof and that obvious changes may be made within the scope of the following claims without departing from the spirit of my invention.

I claim:

1. A pocket gopher poisoning device for forcing entry to an underground gopher tunnel and dispensing a measured amount of gopher poisoning therein from a supply reservoir provided with a handle operated rotor dispenser mounted adjacent and connected by a chute to a tubular body comprising in combination a rotary dispenser means, handle means, lever means connected to said dispenser means, an elongated hollow conduit connected to said handle means provided with a lower end portion belled outwardly immediately above a wedge shaped portion of the conduit ending in a blade and said wedge-shaped portion being substantially trapezoidal in a horizontal elevation, the end walls of said wedge shaped portion being substantially in parallel relationship at the horizontal elevation and one of the connecting walls sloping inwardly and tapering downwardly to substantially a plane through the axis of the hollow conduit and forming a blade having a wedge shaped extremity, the wall of said conduit opposite said tapering wall being separate from the remaining walls and hingedly connected thereto to form a door panel with its bottom edge engaging said tapering wall paralleling its upper blade edge substantially at the axis of the hollow conduit, an arm projecting inwardly at substantially right angles from said door panel, and linkage means connecting said door panel with said lever means, whereby upon movement of said lever said door panel is opened simultaneously with dispensing of a gopher poisoning material and upon withdrawal of said conduit from a gopher tunnel the outwardly belled portion of said conduit prevents loose dirt from falling back into the hole caused by forcible entry of the conduit into a gopher tunnel.

2. A pocket gopher poisoning device for dispensing a measured amount of poisoning in an underground gopher tunnel comprising in combination a bait supply reservoir, a tubular body, a chute connecting said reservoir to said tubular body, a handle operated control for dropping poisoned pellets successively from said supply reservoir into said chute, said tubular body being elongated and provided with an intermediate enlarged outwardly belled lower extremity ending in a wedge-shaped portion having substantially parallel wedge shaped connecting end walls and parallel side walls being in substantially trapezoidal arrangement in horizontal elevation, one of said end walls tapering to substantially a plane through the axis of the said tubular body and extending in this plane to form a wedge-shaped flat blade, the opposite of said tapering wall having an opening closed by a hinged closure panel, arm means extending inwardly of said closure panel, and linkage means connecting said arm means for opening of said closure panel.

References Cited in the file of this patent

UNITED STATES PATENTS

| | | | |
|---|---|---|---|
| 223,834 | Boehmer | Jan. 27, | 1880 |
| 257,820 | Horton | May 9, | 1882 |
| 788,717 | Hart | May 2, | 1905 |
| 967,371 | Gwaltney | Aug. 16, | 1910 |
| 1,027,433 | Rand | May 28, | 1912 |
| 1,253,621 | Martinson | Jan. 15, | 1918 |
| 1,296,771 | Dady | Mar. 11, | 1919 |
| 1,570,087 | Schnoebelen | Jan. 19, | 1926 |
| 2,103,710 | Carner | Dec. 28, | 1937 |
| 2,239,464 | Moger | Apr. 22, | 1941 |
| 2,390,686 | Bishop | Dec. 11, | 1945 |

FOREIGN PATENTS

| | | | |
|---|---|---|---|
| 10,198 | Norway | Dec. 2, | 1901 |
| 930,266 | France | Aug. 4, | 1947 |